United States Patent
Greene et al.

(10) Patent No.: US 7,093,612 B2
(45) Date of Patent: Aug. 22, 2006

(54) SELF-SEALING ONE-PIECE VACUUM FITTING FOR BAGGING OF COMPOSITE MATERIALS

(75) Inventors: Michael A. Greene, Watauga, TX (US); Wayne Sissom, Midlothian, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 10/514,339

(22) PCT Filed: May 19, 2003

(86) PCT No.: PCT/US03/15949

§ 371 (c)(1),
(2), (4) Date: Nov. 12, 2004

(87) PCT Pub. No.: WO03/097286

PCT Pub. Date: Nov. 27, 2003

(65) Prior Publication Data

US 2005/0161092 A1    Jul. 28, 2005

(51) Int. Cl.
*F16K 15/04* (2006.01)
*F16L 29/02* (2006.01)

(52) U.S. Cl. ............... 137/533.11; 137/528; 137/907; 251/149.1; 156/382

(58) Field of Classification Search ........... 137/533.11, 137/533.13, 533.15, 539, 539.5, 907; 251/149, 251/149.1, 149.6; 156/382; 264/DIG. 78, 264/511; 141/65; 425/405.1, 405.2

See application file for complete search history.

(56) References Cited

U.S. PATENT DOCUMENTS

| 3,907,268 | A | * | 9/1975 | Hale ........................... 269/21 |
| 4,732,415 | A | * | 3/1988 | Matin et al. ............ 251/148.28 |
| 4,917,353 | A | * | 4/1990 | Riley ......................... 251/148 |
| 5,882,471 | A | * | 3/1999 | Chandler et al. ......... 156/394.1 |
| 6,234,450 | B1 | * | 5/2001 | Jeory ...................... 251/149.6 |
| 6,745,998 | B1 | * | 6/2004 | Doyle ..................... 251/149.6 |

FOREIGN PATENT DOCUMENTS

GB    2345526 A   * 12/2000

* cited by examiner

*Primary Examiner*—Ramesh Krishnamurthy
(74) *Attorney, Agent, or Firm*—James E. Walton

(57) ABSTRACT

A vacuum fitting having a check valve for use in bagging composite parts prior to and curing the during process, in which the body of the vacuum fitting is formed from a single piece of material, and the check valve has no loose fitting parts is disclosed. The vacuum fitting has a one-piece body portion having a base flange, a central neck portion, and a top quick-connect fitting adapted for releasable connection to a conventional vacuum source. The check valve is disposed within the central neck portion with a snap ring.

19 Claims, 2 Drawing Sheets

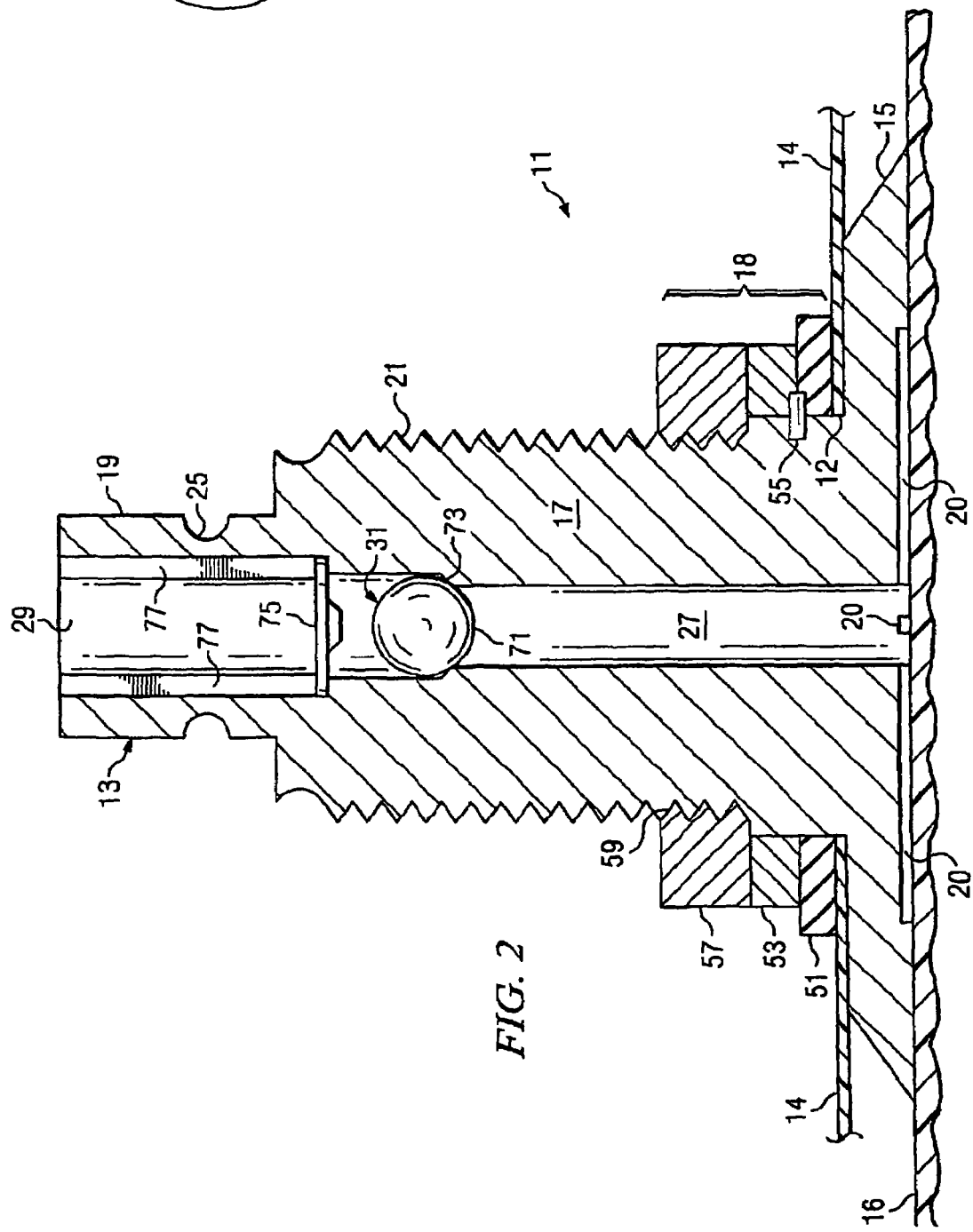

SELF-SEALING ONE-PIECE VACUUM FITTING FOR BAGGING OF COMPOSITE MATERIALS

TECHNICAL FIELD

The present invention relates to vacuum fittings having check valves. In particular, the present invention relates to vacuum fittings having check valves that are used in bagging composite parts and materials prior to and during the curing process.

DESCRIPTION OF THE PRIOR ART

Vacuum fittings with check valves have been around for many years. These vacuum fittings are multi-piece devices formed by connecting many different components together. Typical vacuum fittings include three main parts: (1) a base unit; (2) a middle fitting; and (3) a top fitting. One or more of these vacuum fittings are necessary to evacuate air from the bags that are used to cure composite parts.

The base unit typically includes a base flange, an upraised neck portion, a gasket, a collar, a pin, and a locking ring. The base flange is disposed within the bag that encloses the composite part to be cured. The neck portion sticks out through an aperture in the bag, and receives the gasket such that the bag portion is sandwiched between the base flange and the gasket. The collar fits over the gasket, and the pin fits into slots in the neck portion, gasket, and collar, to prevent the gasket and collar from rotating relative to the neck portion. The locking ring is threaded over the neck portion to compress the collar, the gasket, and the bag material against the base flange, thereby providing an airtight seal.

The middle fitting is basically an adapter coupling between the base unit and the top fitting. The middle fitting is necessary because most manufacturers prefer to utilize a particular industry standard top fitting. An O-ring seal must be used between the base unit and the middle fitting, and the threads of the neck portion of the base unit are typically treated with sealing tape prior to connection to the middle fitting, to prevent leaks.

The top fitting is usually an off-the-shelf, industry standard, quick-connect fitting that accepts a conventional vacuum source. A second O-ring is necessary between the middle fitting and the top fitting. A plunger-type, spring-biased check valve assembly is assembled into the top fitting, and includes several loose fitting parts, including a plunger assembly having a valve seat, a brace plate, a spring, and a third O-ring seal.

In operation, the composite part to be cured is wrapped with the bag material. One or more vacuum fittings are then installed at selected locations through apertures in the bag material. Then, the vacuum fittings are sealed up against the bag material. A vacuum source is then connected to the quick-connect fitting of each vacuum fitting. The quick-connect fittings of the vacuum source open the check valves inside the vacuum fittings. Then, the air is evacuated from the bag to aid in the consolidation of the plies and resin. The entire assembly is then heated to cure the resin. After the curing process, the bag and its attached vacuum fittings are removed from the composite part. The bag is discarded, and the vacuum fittings are cleaned, checked, repaired, and leak checked prior to being stocked for re-use.

Unfortunately, there are many problems associated with these vacuum fittings. For example, since they are assembled from at least three separate parts, and because the check valves contain many loose fitting parts, they are susceptible to failure and leaking at many different locations. Also, due to the extreme temperatures of the curing process, the O-rings tend to dry out, and, as a result, must be frequently checked and replaced. In addition, resin is often pulled into the check valve as the air is being evacuated from the bag, which can clog the loose fitting parts of the check valve. All of these problems lead to failures and leaks, and if one of these vacuum fittings fails or leaks during use, the entire composite part being cured can be lost, which can be very expensive.

Another problem associated with these vacuum fittings is that they are machined from heavy materials, such as steel and aluminum. This makes them very heavy relative to the bag material through which they are installed. The excessive weight causes the vacuum fitting to stretch the bag material and pull away from the composite part leaving gaps between the bag material and the composite part. In some situations, particularly when the vacuum fitting is located in a position on the side or underneath the composite part, the weight of the vacuum fitting can tear the bag material. If this happens, the composite part must be completely debagged and re-bagged, and all of the vacuum fittings reinstalled.

These vacuum fittings are very expensive to purchase and very costly to maintain. They must be thoroughly inspected, cleaned, maintained, and repaired before each use. The inspection, cleaning, disassembly, and reassembly of these vacuum fittings is a very time consuming and labor intensive process.

Thus, considerable shortcomings remain in the area of vacuum fittings having check valves that are used in bagging composites prior to and during the curing process.

SUMMARY OF THE INVENTION

There is a need for a vacuum fitting having a check valve for use in bagging composite parts prior to and during the curing process, in which the body of the vacuum fitting is formed from a single piece of material.

There is also a need for a vacuum fitting having a check valve for use in bagging composite parts prior to and during the curing process, in which the check valve has no loose fitting parts.

Therefore, it is an object of the present invention to provide a vacuum fitting having a check valve for use in bagging composite parts prior to and during the curing process in which the body of the vacuum fitting is formed from a single piece of material.

It is another object of the present invention to provide a vacuum fitting having a check valve for use in bagging composite parts prior to and during the curing process in which the check valve has no loose fitting parts.

These objects are achieved by providing a vacuum fitting having a check valve for use in bagging composite parts prior to and during the curing process in which the body of the vacuum fitting is formed from a single piece of material, and the check valve has no loose fitting parts. The vacuum fitting has a one-piece body portion having a base flange, a central neck portion, and a top quick-connect fitting adapted for releasable connection to a conventional vacuum source. A check valve having no loose fitting parts is disposed within the central neck portion with a snap ring.

The unique integral design of the vacuum fitting allows the body portion to be manufactured from lightweight, non-metallic materials, such as injection-molded plastic and nylon. Because the body portions can be made from such materials quickly, easily, and in large numbers, the vacuum fittings can be used one time and discarded. This leads to tremendous savings in cost, time, and labor, as the vacuum fittings do not have to be collected, check, cleaned, or repaired after each use.

The present invention provides many significant benefits and advantages, including: (1) at least two components parts are eliminated; (2) the need for at least two seals is eliminated, thereby reducing the chance that the vacuum fitting might leak; (3) the check valve has no loose-fitting parts; (4) assembly and disassembly time is greatly reduced; (5) the unique integral design of the body portion of the vacuum fitting allows it to manufactured from lightweight, disposable materials; and (6) the use of lightweight materials reduces the chance that the vacuum fitting will stretch or damage the bag material.

BRIEF DESCRIPTION OF THE DRAWINGS

FIG. 2 is a longitudinal cross-sectional view of an alternate embodiment of the self-sealing one-piece vacuum fitting for bagging of composite materials according to the present invention.

FIG. 3 is a top view of the top portion of the vacuum fitting of FIG. 2.

DESCRIPTION OF THE PREFERRED EMBODIMENT

Figure 1:
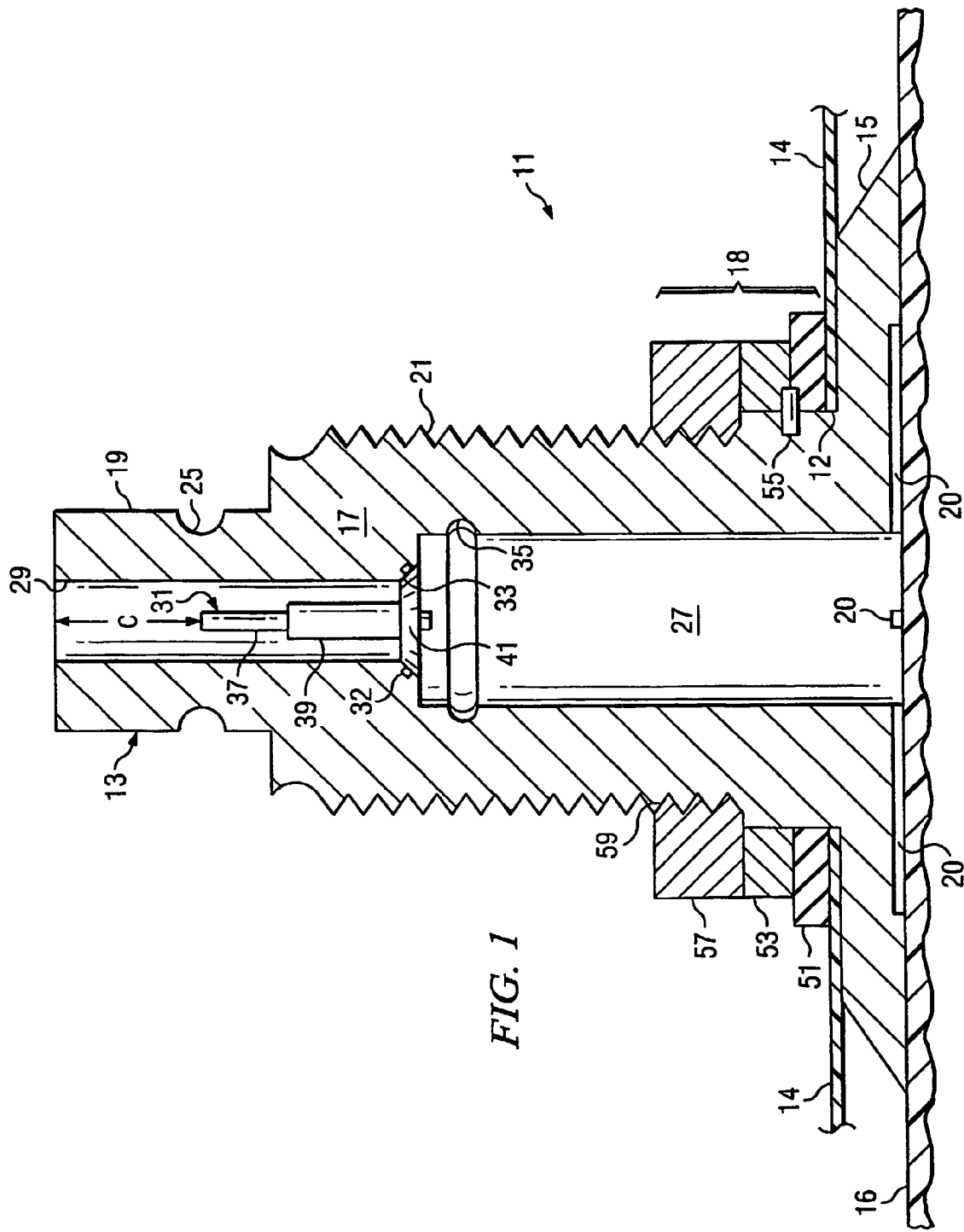
FIG. 1 is a longitudinal cross-sectional view of the self-sealing one-piece vacuum fitting for bagging of composite materials according to the present invention.

The vacuum fitting of the present invention is used to evacuate air from a sealed bag that surrounds an uncured composite part or assembly. The vacuum fitting of the present invention is configured to be installed through, and sealed to, a thin plastic membrane. To prevent the vacuum fitting from venting to the atmosphere in the event that the vacuum source is removed, the vacuum fitting of the present invention includes a check valve having no loose fitting parts.

Referring to FIG. 1 in the drawings, a self-sealing one-piece vacuum fitting 11 for bagging of composite materials according to the present invention is illustrated. Vacuum fitting 11 is installed through an aperture 12 in a bag material 14 that is wrapped around a composite part 16 that is to be cured. Vacuum fitting 11 includes a one-piece generally cylindrical body portion 13, a connection means 18 operably associated with body portion 13 for sealing body portion 13 to bag material 14, and a valve means 31. Body portion 13 has a circular base flange 15, an elongated cylindrical neck portion 17, a top portion 19, a central lower channel 27, and a central upper channel 29. It will be appreciated that although the terms "upper" and "lower" may be used herein to describe certain elements, the present invention can be used in any orientation.

Base flange 15 preferably tapers radially inward over its height to facilitate a smooth transition for bag material 14 from base flange 15 to composite part 16. In the preferred embodiment, base flange 15 includes at least one radially extending recessed port 20 in fluid communication with lower channel 27 that facilitates the suction of air into lower channel 27. Although recessed ports 20 are shown extending only partially across the diameter of base flange 15, it will be appreciated that in certain applications, it may be desirable that recessed ports 20 extend across the entire diameter of base flange 15. Neck portion 17 preferably includes external threads 21 for receiving a locking ring 57, as explained in more detail below. Top portion 19 is preferably configured to receive a conventional quick-connect coupling of a conventional vacuum source (not shown). As such, top portion 19 may include one or more annular grooves or ridges 25.

Lower channel 27 and upper channel 29 are separated by a valve means 31. Valve means 31 is spring biased against an annular valve seat 33 located at the lower end of upper channel 29 by a fastener means (not shown). The fastener means is preferably a C-type snap ring fastener and/or a spring that snaps into an internal annular groove or slot 35 located at the upper end of lower channel 27. A conventional seal means 32, such as an O-ring, may be disposed between valve means 31 and valve seat 33 to provide an airtight seal between lower channel 27 and upper channel 29 when valve means 31 is in the closed position. Valve means 31 prevents vacuum fitting 11 from venting to the atmosphere when the vacuum source is removed from top portion 19. Although upper channel 29 is shown having a diameter less than that of lower channel 27, it should be understood that in certain applications; and depending upon the type and configuration of valve means 31, upper channel 29 may have a diameter that is equal to or larger than that of lower channel 27.

In the preferred embodiment, valve means 31 is a plunger-type check valve having a valve stem 37, a valve body 39, and a valve flange 41. The top of valve stem 37 is preferably located a distance C from the top of top portion 19 to facilitate connection to and operation with the conventional quick-connect coupling of the conventional vacuum source. It should be understood that valve means 31 may be another type of valve, such as a ball valve, as described below.

Connection means 18 preferably includes a gasket 51, a collar 53, a pin 55, and a locking ring 57. Pin 55 is received in slots in gasket 51, collar 53, and neck portion 17 to prevent rotation of gasket 51 and collar 53 relative to neck portion 17. When assembled, bag material 14 is sandwiched between the upper surface of base flange 15 and the lower surface of gasket 51. Locking ring 57 includes internal threads 59 that mate with external threads 21 of neck portion 17. Locking ring 57 compresses gasket 51, collar 53, and bag material 14 against base flange 15, thereby forming an airtight seal.

In operation, composite part 16 to be cured is wrapped with bag material 14. One or more of vacuum fittings 11 are then installed at selected locations from the inside of bag material 14 so that base flange 15 remains inside bag material 14 and neck portion 17 protrudes out through aperture 12 in bag material 14. Connection means 18 is then installed. Gasket 51 and collar 53 are then installed over neck portion 17 so that gasket 51 comes into contact with bag material 14. in addition, gasket 51 and collar 53 are aligned with pin 55 to prevent gasket 51 and collar 53 from rotating relative to neck portion 17. Locking ring 57 is then threaded down over neck portion 17 so as to compress collar 53, gasket 51, and bag material 14 against base flange 15, thereby forming a vacuum seal. The vacuum source is then connected to top portion 19 by snapping into annular groove 25. The vacuum source includes a stem that extends into upper channel 29 to engage valve stem 37 and force valve stem 37 downward, thereby opening valve means 31. Then, the air is evacuated from bag material 14 by the vacuum source. Because body portion 13 is of a one-piece configuration requiring fewer seals, vacuum fittings 11 have a substantially reduced chance of leaking during operation. Resin (not shown) is then pumped or drawn into bag material 14. The entire assembly is then heated to cure the resin. After the curing process, bag material 14 is removed from composite part 16. Then, vacuum fittings 11 are removed from bag material 14 and/or composite part 16. The unique configuration of vacuum fittings 11 allows vacuum fittings 11 to be reused more easily and more frequently than conventional vacuum fittings.

In the embodiment in which body portion 17 is made from lightweight plastic or nylon, vacuum-fitting 11 may be considered disposable and may be simply discarded after a single use. This is possible due to the greatly reduced cost of manufacturing vacuum fitting 11.

Referring now to FIGS. 2 and 3 in the drawings, an alternate embodiment of vacuum fitting 11 is illustrated. In this embodiment, valve means 31 is a ball valve having a ball 71 that seats against a chamfered surface 73. In the preferred embodiment, ball 71 is a silicone rubber ball. Ball 71 is held in place by a retaining member 75 that is installed through opposing longitudinal slots 77 in upper channel 29. Retaining member 75 allows the air to pass through as the air is being evacuated from bag material 14.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A vacuum fitting for use with a bag material for curing a composite part comprising:
   a one-piece body portion comprising:
      a base flange;
      a neck portion extending from the base flange; and
      a top fitting adapted to releasably receive a vacuum source;
      wherein the body portion defines a central upper channel, a central lower channel, and a valve seat between the central upper channel and the central lower channel, such that the central lower channel is in fluid communication with the central upper channel;
   a valve disposed between the upper channel and the lower channel, the valve having a valve stem and a valve flange, such that the valve flange interfaces with the valve seat to inhibit a flow of fluid between the valve flange and the valve seat;
   a spring biasing the valve flange toward the valve seat, the spring spaced away from the base flange;
   a gasket disposed about the one-piece body portion;
   a collar disposed about the one-piece body portion;
   a pin extending from the one-piece body portion into the gasket and into the collar; and
   a locking ring threadedly engaged with the one-piece body portion operable to compress the collar, the gasket, and the bag material against the base flange, such that an airtight seal is produced between the baa material and the vacuum fitting.

2. The vacuum fitting of claim 1, further comprising:
   a seal disposed between the valve flange and the valve seat.

3. The vacuum fitting of claim 1, wherein the valve has no loose fitting parts.

4. The vacuum fitting of claim 1, wherein the top fitting defines at least one annular groove to receive a quick-connect coupling of the vacuum source.

5. The vacuum fitting of claim 1, further comprising:
   at least one port recessed into the base flange to facilitate the suction of air into the lower channel.

6. The vacuum fitting of claim 1, further comprising:
   fastener means for fastening the valve between the upper channel and the lower channel.

7. The vacuum fitting of claim 1, further comprising:
   a snap ring fastener for securing the valve between the upper channel and the lower channel;
   wherein the body portion defines an internal annular groove in an upper end of the lower channel for receiving the snap ring fastener.

8. The vacuum fitting of claim 1, wherein the body portion is machined from a metallic material.

9. The vacuum fitting of claim 8, wherein the metallic material is one of steel and aluminum.

10. The vacuum fitting of claim 1, wherein the body portion is made from plastic.

11. The vacuum fitting of claim 1, wherein the body portion is made from nylon.

12. A vacuum fitting for use with a bag material for curing a composite part comprising:
    a one-piece body portion comprising:
       a base flange;
       a neck portion extending from the base flange; and
       a top fitting adapted to releasably receive a vacuum source;
       wherein the body portion defines a central upper channel, a
       central lower channel, and a valve seat between the central upper
       channel and the central lower channel, such that the central lower
       channel is in fluid communication with the central upper channel;
    a ball disposed between the upper channel and the lower channel, such that the ball interfaces with the valve seat to inhibit a flow of fluid between the valve flange and the valve seat;
    a gasket disposed about the one-piece body portion;
    a collar disposed about the one-piece body portion;
    a pin extending from the one-piece body portion into the gasket and into the collar; and
    a locking ring threadedly engaged with the one-piece body portion operable to compress the collar, the gasket, and the bag material against the base flange, such that an airtight seal is produced between the baa material and the vacuum fitting.

13. The vacuum fitting of claim 12, further comprising:
    a ball retainer engaged with the neck portion of the one-piece body portion.

14. The vacuum fitting of claim 12, wherein the top fitting defines at least one annular groove to receive a quick-connect coupling of the vacuum source.

15. The vacuum fitting of claim 12, further comprising:
    at least one port recessed into the base flange to facilitate the suction of air into the lower channel.

16. The vacuum fitting of claim 12, wherein the body portion is machined from a metallic material.

17. The vacuum fitting of claim 16, wherein the metallic material is one of steel and aluminum.

18. The vacuum fitting of claim 12, wherein the body portion is made from plastic.

19. The vacuum fitting of claim 12, wherein the body portion is made from nylon.

* * * * *